United States Patent [19]

Skarvada

[11] Patent Number: 4,484,281
[45] Date of Patent: Nov. 20, 1984

[54] APPARATUS FOR GENERATING A LEAD SIGNAL IN AN ANTISKID SYSTEM

[75] Inventor: Thomas Skarvada, Granada Hills, Calif.

[73] Assignee: Crane Co., Chicago, Ill.

[21] Appl. No.: 408,864

[22] Filed: Aug. 17, 1982

Related U.S. Application Data

[63] Continuation-in-part of Ser. No. 405,951, Aug. 6, 1982, abandoned, which is a continuation of Ser. No. 146,617, May 5, 1980, Pat. No. 4,344,137.

[51] Int. Cl.³ .......................... B60T 8/00; G06F 15/20
[52] U.S. Cl. ..................................... 364/426; 303/95; 303/109
[58] Field of Search .................... 364/426; 303/91, 95, 303/97, 99, 105, 106, 107, 109; 188/181 C

[56]  References Cited

U.S. PATENT DOCUMENTS

| | | | |
|---|---|---|---|
| 3,614,173 | 10/1971 | Branson | 188/181 C |
| 3,669,508 | 6/1972 | Attri | 303/91 |
| 3,729,234 | 4/1973 | Hirzel | 303/109 |
| 3,843,208 | 10/1974 | Jones | 303/91 |
| 4,036,536 | 7/1977 | Quon | 303/97 |
| 4,068,903 | 1/1978 | Straub | 303/99 |
| 4,078,845 | 3/1978 | Amberg et al. | 303/107 |
| 4,180,223 | 12/1979 | Amberg | 303/106 |
| 4,223,957 | 9/1980 | Brearley et al. | 303/106 |
| 4,269,455 | 5/1981 | Beck et al. | 303/106 |

Primary Examiner—Gary Chin
Attorney, Agent, or Firm—Willian, Brinks, Olds, Hofer, Gilson & Lione Ltd.

[57]  ABSTRACT

An antiskid braking system includes an improved apparatus for generating a lead signal to provide lead compensation. According to one feature of this apparatus the gain is a function of the algebraic sign of the input signal to the apparatus. Preferably, higher gains are used when the input signal corresponds to wheel deceleration than when it corresponds to acceleration. Another feature of the invention is that the apparatus operates to reduce the magnitude of the lead signal when it exceeds a limit value, preferably by clamping the lead signal to a maximum magnitude. A third feature is that first and second order lead signals are utilized in such a way as to preclude adverse cancellation between the two.

8 Claims, 10 Drawing Figures

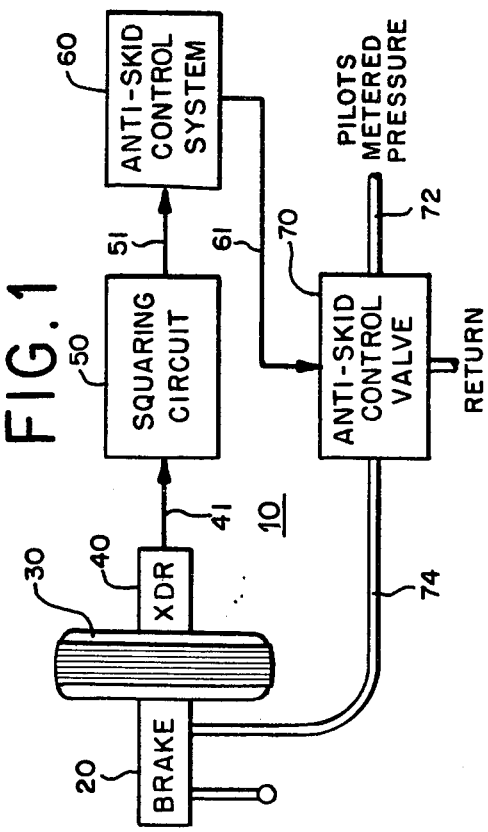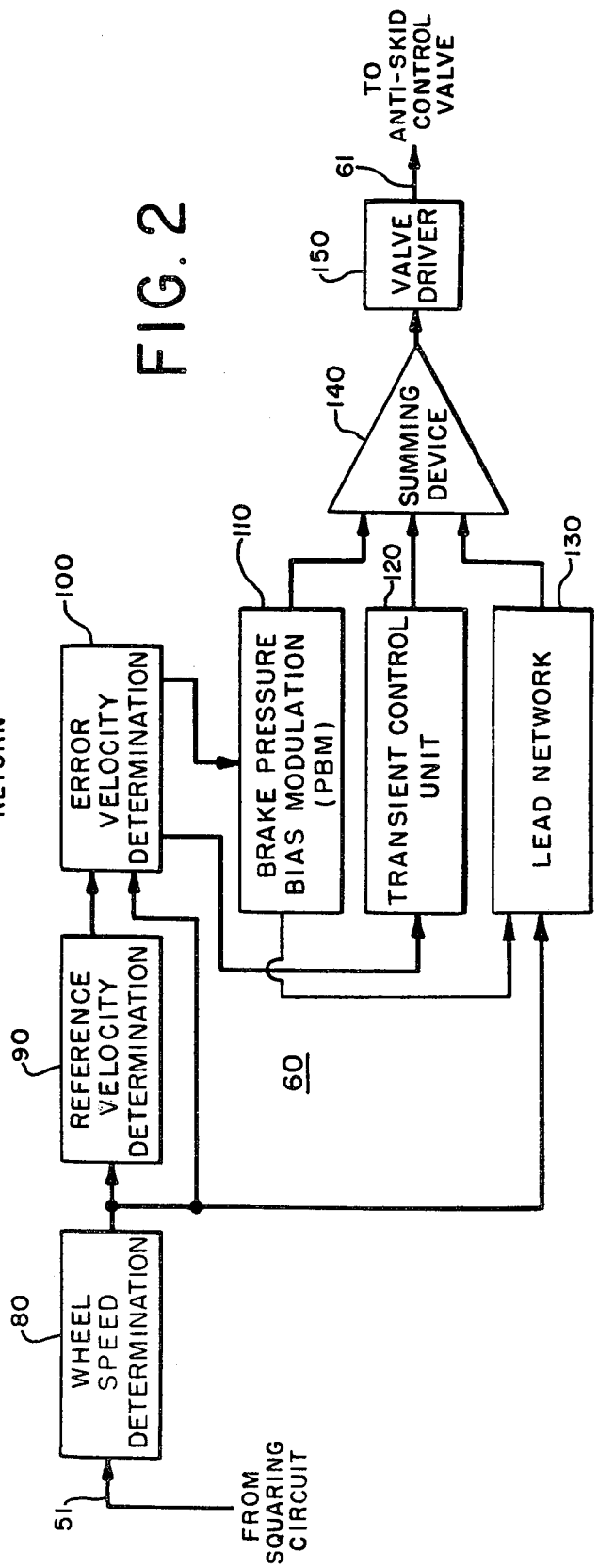

4,484,281

APPARATUS FOR GENERATING A LEAD SIGNAL IN AN ANTISKID SYSTEM

This application is a continuation in part of a copending application (Attorney Docket No. 7818), Ser. No. 06/405,951, filed on Aug. 6, 1982, now abandoned, which is a continuation of application Ser. No. 06/146,617, filed May 5, 1980, now U.S. Pat. No. 4,344,137.

BACKGROUND OF THE INVENTION

This invention relates to an improved lead network in an antiskid braking system.

Antiskid systems have in the past been provided with lead networks to improve braking efficiency. Such lead networks are responsive to a time derivative of a signal and act to anticipate behavior of the braked wheel. For example, in response to a sharply decelerating wheel, a lead network acts to reduce brake pressure and to arrest the wheel deceleration and prevent wheel skids.

SUMMARY OF THE INVENTION

The present invention is directed to an improved apparatus for generating a lead signal in an antiskid system. This improved apparatus provides several important features which cooperate to provide improved braking efficiency.

According to a first feature of the invention, the apparatus is provided with a gain which varies as a function of the input signal to the apparatus. For example, when the input signal is indicative of a first time derivative of wheel rotation, it has been found advantageous to provide a higher gain when the input signal indicates wheel deceleration rather than acceleration. In this case, the apparatus acts to remove brake pressure more quickly than to reapply brake pressure.

According to a second feature of the invention, the magnitude of the lead signal is reduced when it exceeds a limit value. Preferably, the lead signal is clamped to a maximum value. Clamping the lead signal permits the use of very high lead gains without excessively large lead signals. This feature of the invention, which is particularly useful when lead gain is made variable as a function of the brake control signal, permits the lead signal to respond quickly to incipient wheel skids without overcorrecting the brake control signal.

According to a third feature of this invention, means are provided for generating a first lead signal and a second lead signal. These two lead signals are then utilized in a manner which prevents adverse interference between the two. In the presently preferred embodiment, means are provided for selecting the larger of the two lead signals and then supplying only this selected lead signal to the antiskid system to be used to modify a brake control signal. In this way, cancellation problems of prior art systems which added first and second order lead signals together are avoided.

The invention, together with further objects and attendant advantages, will be best understood by reference to the following detailed description taken in connection with the accompanying drawings.

BRIEF DESCRIPTION OF THE DRAWINGS

FIG. 1 is a block diagram of a brake control system including an antiskid control system.

FIG. 2 is a detailed block diagram of the functional components of the antiskid control system of FIG. 1.

DETAILED DESCRIPTION OF THE PREFERRED EMBODIMENTS

Figure 3:
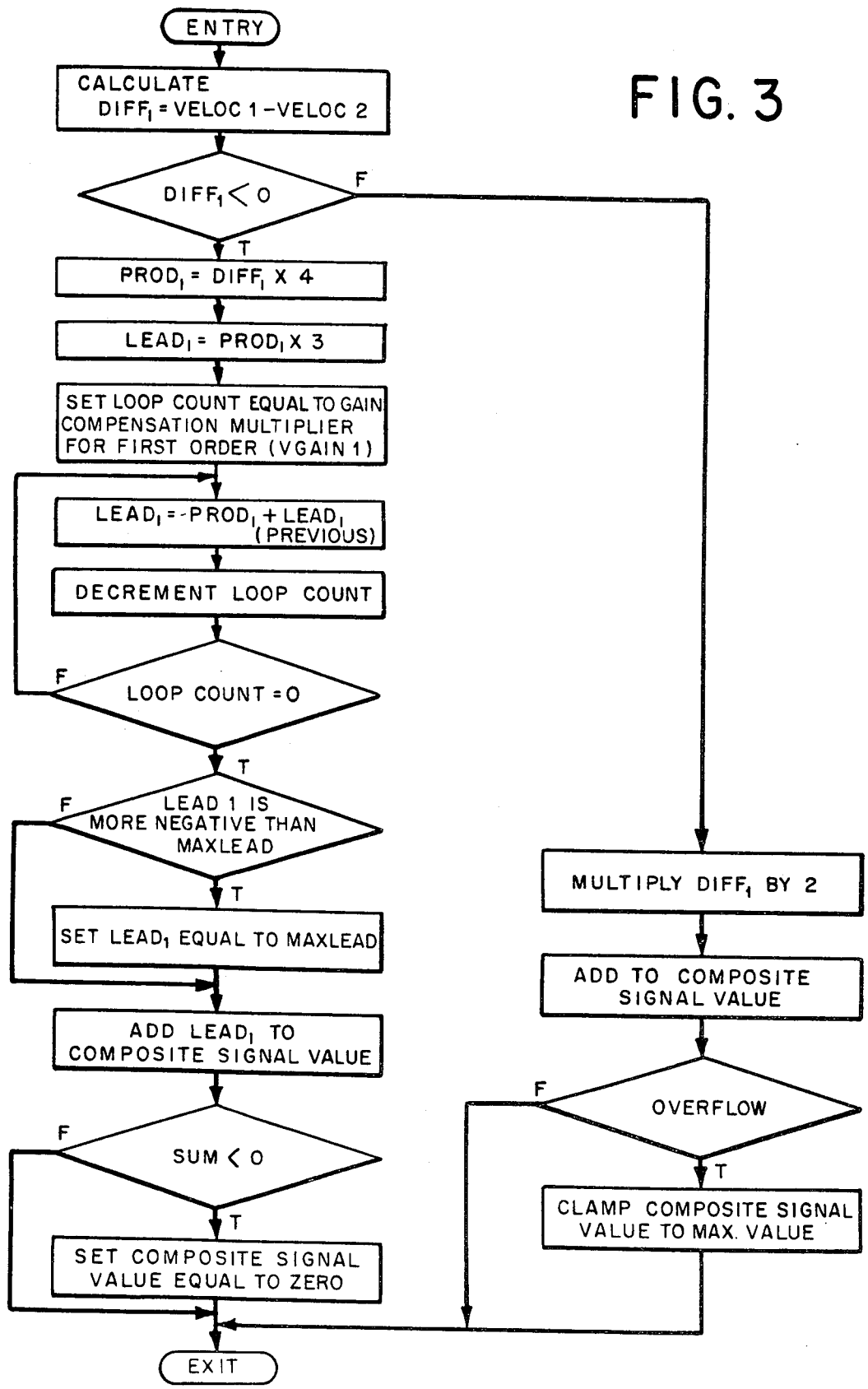
FIG. 3 is a flow chart of a first preferred embodiment of the first order lead portion of the lead network of FIG. 2.

Referring now to the drawings, two preferred embodiments of the improved lead network of the present invention will be described in connection with the brake control system shown in FIGS. 1 and 2. FIG. 1 shows the major components of an antiskid brake control system 10 which provides brake control for the brake 20 of a rotatable wheel 30. The system 10 includes a wheel-speed transducer 40 which produces a sinusoidal signal on line 41 having a frequency proportional to the angular velocity of the wheel 30. The signal on line 41 is shaped in a squaring circuit 50 and is then supplied as a wheel speed signal to an antiskid control system 60 via line 51. The antiskid control system 60 monitors the wheel signal on line 51. When the wheel signal indicates that the wheel 30 is about to go into a skid due to excessive braking force, the antiskid system 60 generates a brake control signal on line 61. The antiskid control valve 70 is positioned in the brake line 72 which supplies brake fluid under pressure to the brake 20, and the valve 70 operates in response to the signal on line 61 to reduce the brake pressure applied to the brake 20.

In this preferred embodiment, the brake pressure in line 72 is the metered pressure determined by the vehicle operator by means of conventional hydraulic controls. As long as the wheel 30 is not braked so severely as to go into a skid, the full metered pressure in the line 72 is passed by the valve 70 via the line 74 to the brake 20. However, if the metered brake pressure exceeds the skid threshold and drives the wheel 30 into a skid, the antiskid system 60 will generate a brake control signal on line 61 which causes the valve 70 to reduce the pressure in the line 74 to a value less than the metered pressure. By reducing the pressure applied to the brake 30, the braking torque is reduced and the wheel 30 is prevented from skidding.

FIG. 2 shows a schematic representation of the antiskid system 60 of FIG. 1, including a wheel speed determination unit 80 which uses the wheel signal on line 51 as an input and generates an output signal representative of measured wheel speed. This wheel speed signal is supplied as an input to a reference velocity determination unit 90 for generating a reference velocity signal. This reference velocity signal is applied as an input to an apparatus 100 for determining an error velocity signal representative of the difference between the measured wheel speed signal and the reference velocity signal. The error velocity signal is applied as an input to two separate control units: the brake pressure bias modulation unit, or modulator 110, and the transient control unit 120.

The modulator 110 integrates the error velocity signal over time to arrive at a time averaged, modulated signal representative of the optimum braking pressure.

This signal is smoothly and continuously modulated to either increase or decrease the applied brake pressure as needed to substantially prevent excessive wheel skidding while maintaining a high, effective level of braking.

Because the output of the modulator 110 is a time integral function of the error velocity signal, it will on occasion be unable to respond quickly enough to prevent a wheel skid. For example, when a braked wheel suddenly enters a tar strip or an ice patch or a wet surface, the skid threshold will abruptly fall and the modulator 110 may be unable to prevent a deep skid if the wheel 30 is heavily braked. Under these conditions, the transient control unit 120 responds to a large error velocity signal by commanding a sharp and sudden reduction in applied brake pressure.

The wheel speed signal is also applied as an input to a lead network 130 which responds to changes in the wheel speed signal to anticipate trends and to command an early modification in brake pressure to anticipate skids.

Outputs from the modulator 110, the transient control unit 120, and the lead network 130 are summed in a summing device 140 to produce a brake control signal which is amplified by the valve driver 150 and then applied as a control signal via line 61 to the antiskid control valve.

The foregoing description of the brake control system 10 is provided to set forth the environment of a preferred embodiment of the lead network apparatus of this invention. With the exception of the lead network 130, individual components of this environment do not form a part of the present invention, and for that reason will not be described in detail here. Furthermore, those skilled in the art are familiar with various forms of these components. For example, one form of the wheel speed determination unit 80, the error velocity determination unit 100, the modulator 100, and the transient control unit 120 is shown in U.S. Pat. No. 3,724,916, issued Apr. 3, 1973 to Edgar A. Hirzel, and entitled "Controlled Wheel Braking System". Other forms of the wheel speed determination unit 80 are described in U.S. Pat. No. 4,056,287, issued Nov. 1, 1977 to Wolfgang Gudat; and in U.S. Pat. No. 4,125,295, issued Nov. 14, 1978 to Gerhard Ruhnam, et al.

The present invention is directed to improved lead networks for a brake control system. A first preferred embodiment of this invention, included in lead network 130 of FIG. 2, will be described in conjunction with the flow charts of FIGS. 3–5. A second preferred embodiment of this invention will be described in conjunction with the flow chart of FIGS. 6a and 6b.

Figure 4:
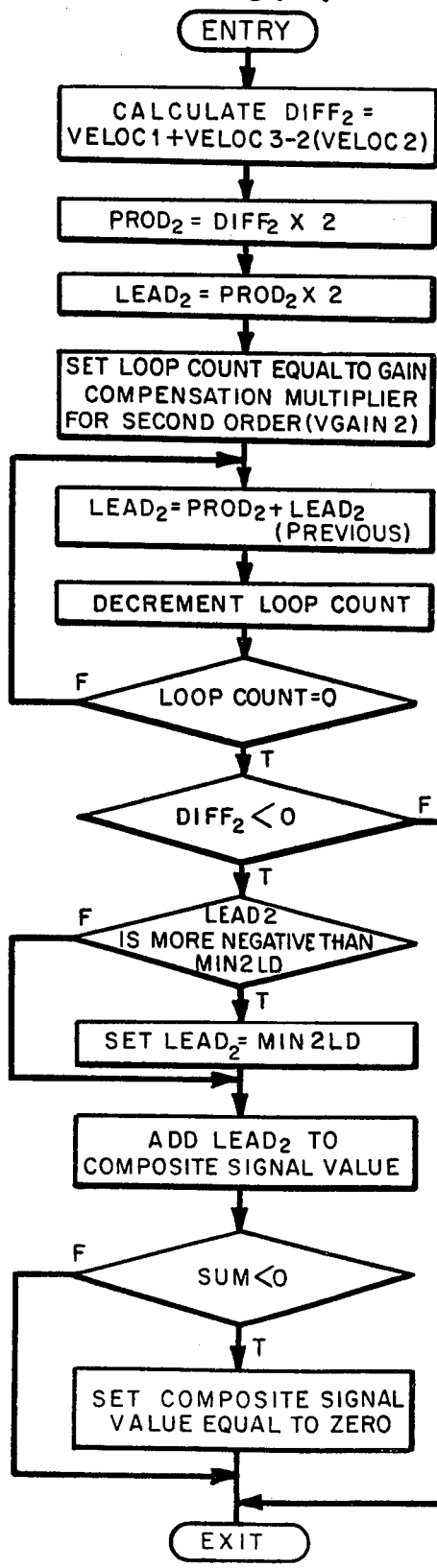
FIG. 4 is a flow chart of a first preferred embodiment of the second order lead portion of the lead network of FIG. 2.
Figure 5:
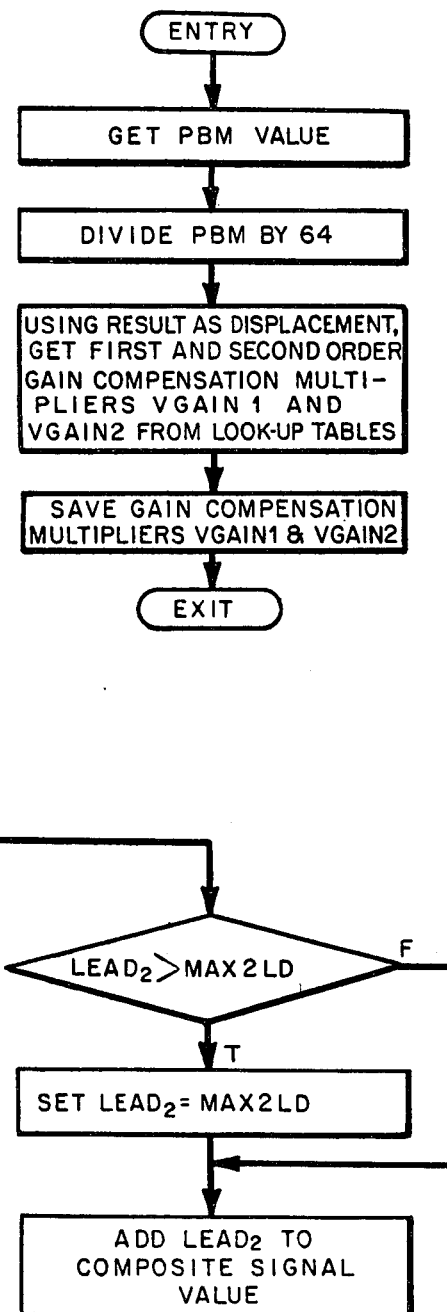
FIG. 5 is a flow chart of a first preferred embodiment of the lead compensation gain routine.
Figure 6A:
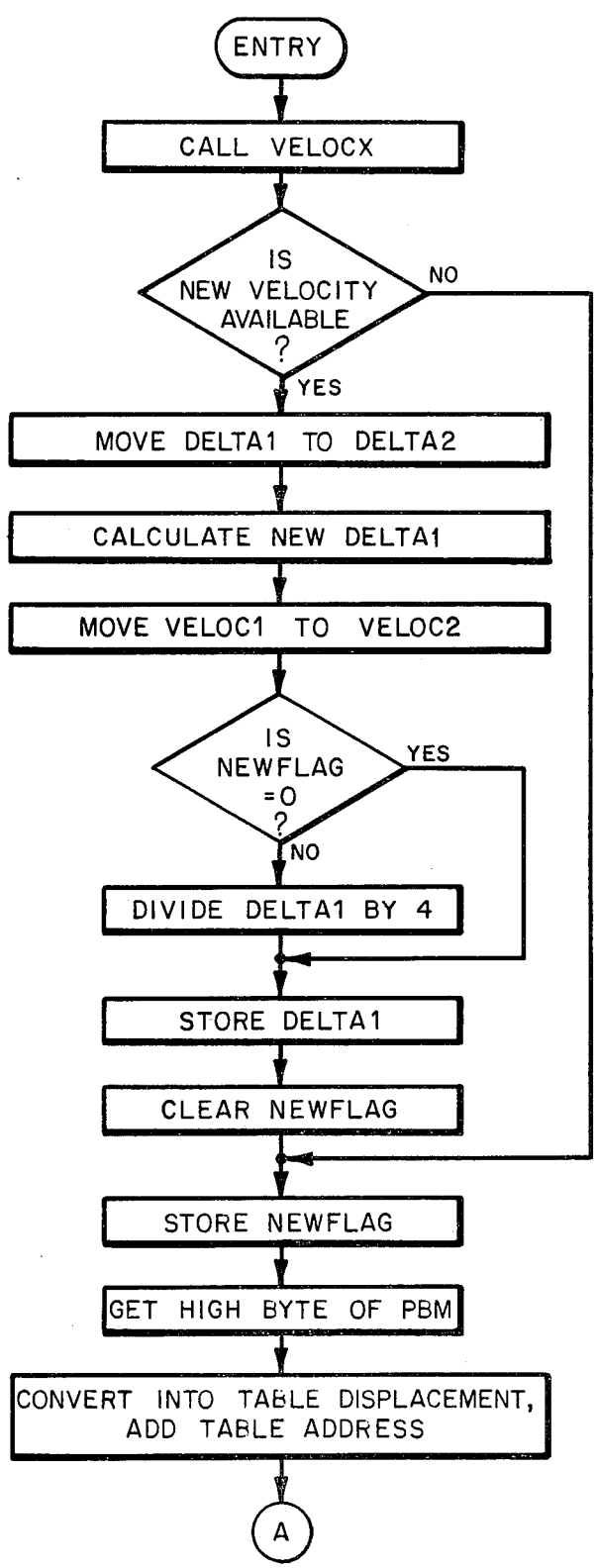
FIGS. 6a and 6b are a flow chart of a second preferred embodiment of the lead network of FIG. 2.
Figure 6B:
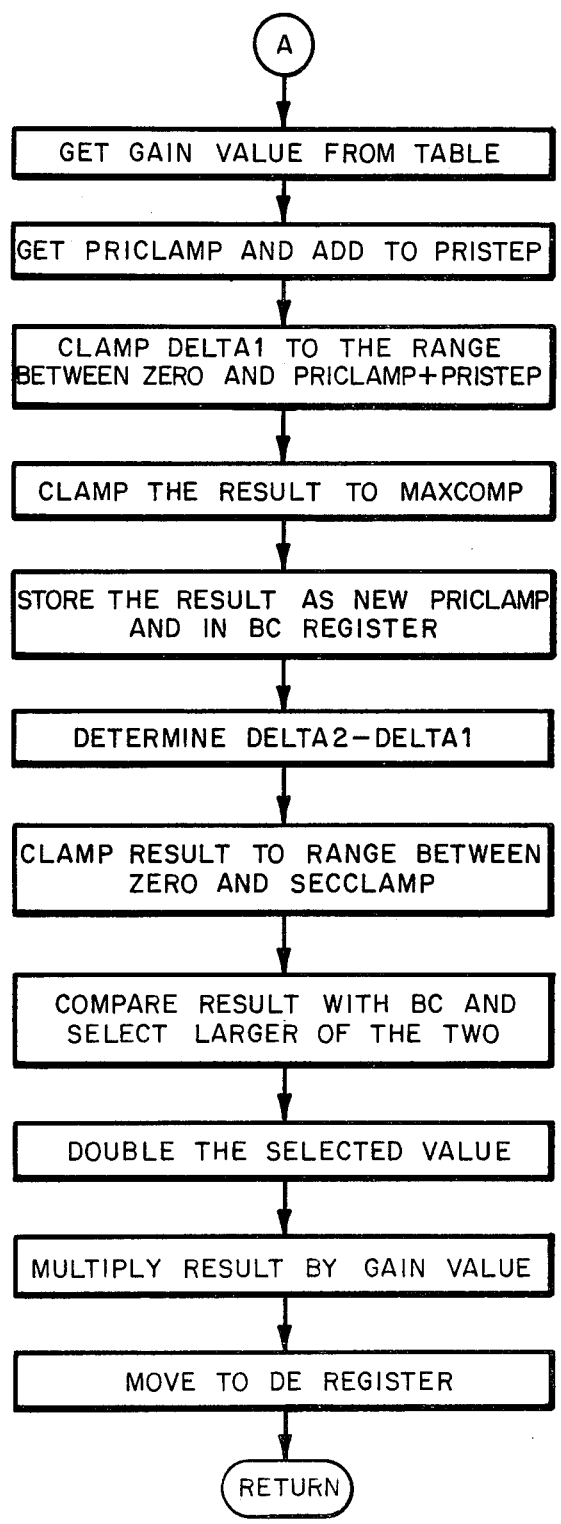

The presently preferred embodiments of this invention are implemented as a programmed microprocessor. The presently preferred microprocessor is a Z-80 CPU manufactured by Zilog, Inc., Cupertino, Calif. The program presented in flow chart form in FIGS. 3–5 is listed in assembly language form in Tables I–IV, and the program presented in flow chart form in FIGS. 6a and 6b is listed in assembly language form in Tables V, VI and VII.

THE FIRST PREFERRED EMBODIMENT

Turning now specifically to FIGS. 2–5 and Tables I–IV, the program of the first preferred embodiment is executed periodically (203 times each second in this preferred embodiment) to determine first and second order lead signals. These lead signals are then added to signals produced by the modulator 110 and the transient control 120, and the sum is used to control the valve driver 150.

As mentioned earlier, the lead network can be used with a wide variety of brake control systems. This preferred embodiment utilizes three dynamic variables generated by the remainder of the brake control system.

First, this preferred embodiment accepts as an input the three most recent measurements of wheel velocity, which are labeled VELOC1, VELOC2, and VELOC3 in the listings. Here, VELOC1 is the most recently measured wheel velocity; VELOC2 is the wheel velocity measured in the last cycle, 1/203 of a second before VELOC1; and VELOC3 is the wheel velocity measured in the next to last cycle, 2/203 of a second before VELOC1.

Second, this embodiment accepts as an input the output signal of the modulator, labeled PBM in the listings. Here, modulator output corresponds generally to the average level of brake pressure applied to the brake 20. Thus, a high modulator output corresponds to a high coefficient of friction between the wheel 30 and the pavement. In practice, the antiskid valve 70 is generally designed to require a large current to bring about a large reduction in brake pressure and therefore the driver 150 is designed to invert the signal from the summing device 140 prior to amplification to obtain the desired relationship between modulator signal and valve control signal.

Third, this embodiment accepts as an input a signal COMPOS, which is related to the sum of the signals produced by the modulator 110 and the transient control unit 120.

Turning now to FIG. 3, the first order lead signal is determined as a function of VELOC1, VELOC2, and PBM. In each case, the first order difference of the wheel velocity, DIFF1, is set equal to VELOC1−VELOC2. The first order lead signal is then set equal to DIFF1 multiplied by a gain factor. The gain factor is not a constant, but instead varies as a function of the algebraic sign of DIFF1 and the magnitude of PBM.

As shown in FIG. 3, if VELOC1 is greater than VELOC2, indicating that wheelspeed is increasing, then the first order lead signal is set equal to two times DIFF1. This signal is then added to the composite signal COMPOS. The result is compared with a maximum value, and clamped to the maximum value if necessary to correct an overflow condition.

On the other hand, if VELOC2 is greater than VELOC1, indicating that wheelspeed is decreasing, then the first order lead signal is set equal to (12+4(VGAIN1))DIFF1, where VGAIN1 is a gain compensation multiplier for first order which will be explained in greater detail below. In addition, the first order lead signal is clamped to a maximum negative value if it is more negative than that value. The clamped first order lead signal is then added to COMPOS, the composite signal, and the result is set equal to zero if negative.

As shown in FIG. 5, the gain compensation multiplier for first order, VGAIN1, is determined in accordance with the value of the modulator output signal PBM. PBM is divided by 64 and the quotient is used as a pointer to a lookup table, TABLE 1. Depending on the value of PBM, the variable VGAIN1 is then set equal to one of the 32 possible values stored in TABLE 1.

In general, a higher value of PBM corresponds to a higher average brake pressure and a higher value of Mu, the coefficient of friction between the tire and the pavement. In high Mu conditions the wheel can quickly enter a skid due to the high drag levels and the relatively sharp peak of the Mu-slip curve. In computer simulations, it has been found preferable to increase the gain of the lead network during high Mu conditions and to reduce gain of the lead network during low Mu conditions in order to maximize braking efficiency. As shown in Table 4, the preferred embodiment varies VGAIN1 between a low of 2 for low PBM values and a high of 10 for high PBM values.

From the foregoing, it should be apparent that the first order lead network of FIG. 3 provides a high degree of flexibility. First, the gain of the lead network is a function of the sign of DIFF1, the difference between VELOC1 and VELOC2. In this preferred embodiment, the gain is set equal to 2 for positive values of DIFF1, corresponding to an accelerating wheel, and to (12+4(VGAIN1)) for negative values of DIFF1, corresponding to a decelerating wheel. By using a higher gain for the first order lead network for negative rather than positive lead signals, this embodiment acts to reduce brake pressure more quickly than to increase brake pressure. Thus, brake pressure is reduced quickly in the face of wheel deceleration to arrest and reverse impending skids; but brake pressure is increased less quickly in the face of wheel acceleration. In computer simulation, this assymetrical gain for the first order lead network has been found to provide increased braking efficiency.

An additional feature which contributes to flexibility is the variable gain feature. First order lead gain for a decelerating wheel is equal to (12+4(VGAIN1)), and VGAIN1 varies from a low of 2 for low values of PBM (corresponding to wet or icy conditions) to a high of 10 for high values of PBM (corresponding to dry pavement). Thus, first order lead gain for a decelerating wheel is variable between 20 and 52, depending on the actual braking conditions. Of course, the actual values of VGAIN1 as a function of PBM can be chosen as necessary to optimize braking efficiency. This variable gain feature provides an important degree of flexibility that allows the antiskid system to be fine tuned to the brake system on which it is used. In this preferred embodiment it is only the gain of the lead network that varies as a function of PBM. Other portions of the antiskid system, such as the modulator 110 and the transient control unit 120, do not vary in gain with PBM, as does the lead network.

A third important feature of the embodiment of FIG. 3 is the clamp on the magnitude of the lead signal for a decelerating wheel. Because high gains are used in connection with a wheel deceleration in the first order lead network, there is a possibility that a large deceleration could produce an unacceptably large lead signal. In order to avoid this, the lead signal is clamped to a maximum negative value if it goes more negative than the clamp value. One advantage of such a clamp is that it permits the use of high gains without creating excessively large lead signals. Such a clamped high gain lead network can respond quickly and forcefully to small variations in wheel velocity, thereby preventing incipient skids from developing into skids, and yet not introduce excessively large lead signals into the brake control signal.

FIG. 4 represents a flow chart for the second order lead network of this embodiment, which calculates the second order difference for the wheel velocity according to the formula DIFF2=VELOC1+VELOC3−2-(VELOC2). The second order difference is then multiplied by a gain factor equal to (4+2(VGAIN2)), where VGAIN2 is a variable gain factor generated by the program of FIG. 5. In this preferred embodiment, VGAIN2 is determined in the same manner as VGAIN1 except that a separate lookup table, TABLE 3, is used. VGAIN2 varies between 2 and 10 depending on the value of PBM. Thus, the gain factor for the second order lead ranges between 8 and 24. In contrast to the first order lead of FIG. 3, the second order lead of FIG. 4 employs the same gain factor for both accelerating and decelerating wheel conditions.

The program then branches, depending on the sign of DIFF2. If DIFF2 is positive, the lead signal is clamped to a greatest positive level and added to the composite signal. If DIFF2 is negative, the lead signal is clamped to a greatest negative level and added to the composite signal.

The second order lead of FIG. 4 embodies the variable gain feature and the clamp feature of the first order lead discussed above. Though VGAIN2 is equal to VGAIN1 in this preferred embodiment, it could easily be made to vary with PBM in a manner different from VGAIN1 by altering the contents of the appropriate lookup table.

The programs of FIGS. 3, 4 and 5 are listed in assembly language form in Tables 1, 2, 3 and 4. Table 1 corresponds to the program of FIG. 3; Table 2 corresponds to the program of FIG. 4; Table 3 corresponds to the program of FIG. 5; and Table 4 lists variables and constants used in the listings of Tables 1, 2 and 3. In order to better understand these listings, it should be understood that the wheel speed measurements stored in VELOC1 through VELOC3 are stored as sixteen bit binary numbers scaled to 0.1 foot per second at the least significant bit. Preferably, these velocity measurements are updated 203 times per second, and the programs of Tables 1, 2 and 3 are executed after each update of VELOC1 through VELOC3.

In addition, the variable PBM is directly related to brake pressure and inversely related to valve current. The relationship is linear, scaled such that full scale PBM current (47 milliamps in this embodiment) corresponds to a PBM value of 1280 (hexadecimal) and zero valve current corresponds to a PBM value of 7FFF (hexadecimal). The foregoing examples of specific valve currents are given in terms of valve currents applied to a valve such as the antiskid valve described in U.S. Pat. No. 4,130,322. The constants MAXLEAD, MAX2LD, and MIN2LD are similarly related to valve current, except that the scale factor is chosen such that MAXLEAD corresponds to a valve current reduction of 10.3 mA; MAX2LD corresponds to a valve current reduction of 20.6 mA; and MIN2LD corresponds to a valve current increase of 20.6 mA.

THE SECOND PREFERRED EMBODIMENT

Turning now to FIGS. 6a and 6b and Tables V through VII, the second preferred embodiment also comprises a program which is executed periodically, at intervals of about 5 milliseconds. This program acts to generate a composite lead signal which is stored in the DE register. This composite lead signal is then added to signals produced by the modulator 110 and the transient control 120, and the sum is used to control the valve driver 150. As mentioned previously, the lead network of this invention can be used with a wide variety of brake control systems. This second preferred embodiment utilizes a number of dynamic variables generated by the remainder of the brake control system.

First, this preferred embodiment accepts as an input the two most recent measurements of wheel velocity, which are labeled VELOC1 and VELOC2 in the listing and the flow charts. Here, VELOC1 is the most recently measured wheel velocity and VELOC2 is the wheel velocity measured in the last cycle, 5 milliseconds before VELOC1. As before, VELOC1 and VELOC2 are scaled to 0.1 ft/sec at the least significant bit.

Second, this second preferred embodiment accepts as an input the high order byte of the variable PBM, which is the output signal of the modulator. The variable PBM is a time integral function of an error signal, and PBM is used in the antiskid system described above as a modulated brake control signal. In this second preferred embodiment, PBM is a 16 bit variable which is clamped to the range between 0 and 0D00(HEX). Thus, the high order byte of PBM ranges in value between 0 and 13. PBM is correlated linearly with the valve current associated with the modulated brake control signal such that a PBM value of 0 corresponds to 0 valve current, and a PBM value of 0D00(HEX) corresponds to maximum PBM valve current (45 miliamps in this embodiment).

The listings of Tables V, VI, and VII disclose programs suitable for use with a Z80 microprocessor as described above. In the listings, the symbols A, B, C, D, E, H and L refer to standard registers of the Z80 microprocessor. Throughout, the listings are to be taken as the primary disclosure and the flow charts and the following discussion are intended to clarify the listings.

Turning now to FIGS. 6a and 6b, the lead network of this second preferred embodiment first calls the routine VELOCX. The VELOCX routine updates VELOC1 and sets a flag when a new velocity is available. VELOCX acts to set the A register equal to 0 when a new velocity is available and to a non zero value otherwise. The program of FIG. 6a then calculates a new value for the variable DELTA1 in the event new velocity is available. DELTA1 is set equal to VELOC2 minus VELOC1. Then the high order byte of variable PBM is fetched and used as a table lookup pointer to retrieve a gain value from the table. Thus, the gain value is made a function of PBM and therefore a function of the currently prevailing coefficient of friction between the braked wheel and the pavement, in a manner similar to the first preferred embodiment described above. DELTA1 is then clamped to the range between 0 and a value equal to the previous clamped value of DELTA1 plus the variable PRISTEP. Because of the known inertia of the braked wheel, this program works on the assumption that there is a limit to the acceleration of the wheel between two successive executions of the program of FIG. 6a. Any increase greater than this limit (which is equal to the variable PRISTEP) is therefore ignored. The clamped value of DELTA1 is then clamped to the value MAXCOMP. This clamped value is in effect a first order lead signal, which is stored in the BC register.

The variable DELTA2 is equal to the value of the velocity measured immediately prior to VELOC2 minus VELOC2. Thus, DELTA1 corresponds to the most recent measurement of wheel acceleration and DELTA2 corresponds to the immediately preceding measurement of wheel acceleration.

The next step is to determine DELTA1 minus DELTA2, which is related to the rate of change of wheel acceleration. This value is then clamped to the range between 0 and an upper bound SECCLAMP. The clamped result is in effect a second order lead signal which is related to the second derivative of wheel velocity.

This second order lead signal is then compared with the first order lead signal stored in the register BC. The larger of these two lead signals is selected, doubled, and then multiplied by the gain value previously retrieved from the table. The result is then stored in the DE register and the subroutine returns.

The value stored in the DE register is in effect a composite lead signal which is proportional to the larger of the two lead signals multiplied by the gain value. The lesser of the two lead signals does not interfere with the calculation of the composite lead signal in any way.

Figure 7A:
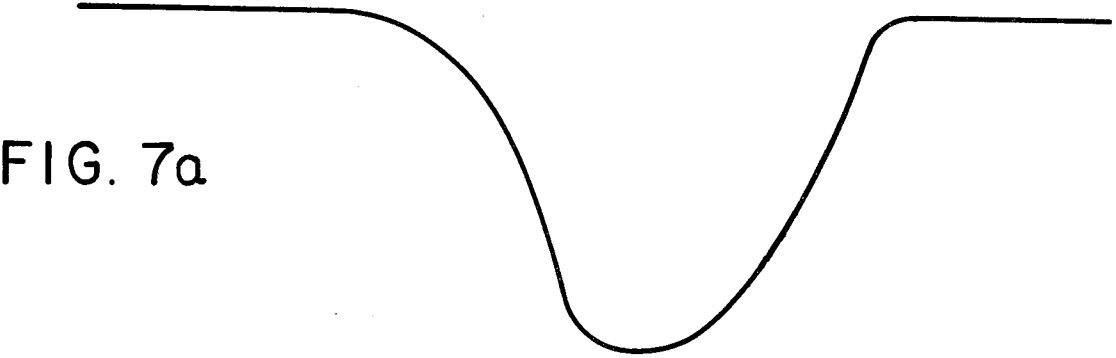
FIGS. 7a, 7b, and 7c illustrate the operation of the preferred embodiment of FIGS. 6a and 6b.
Figure 7B:
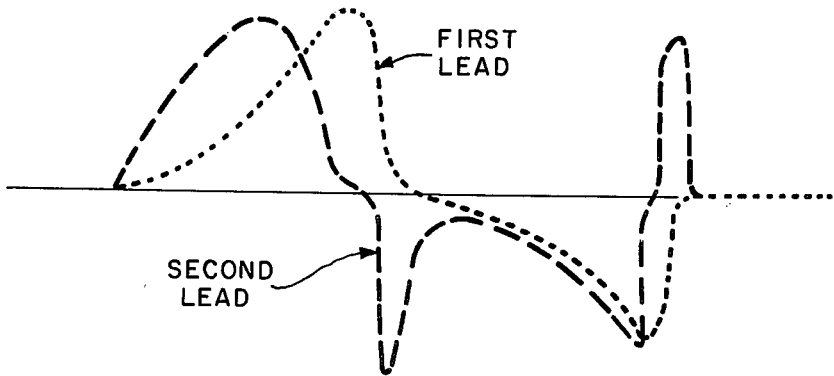
Figure 7C:
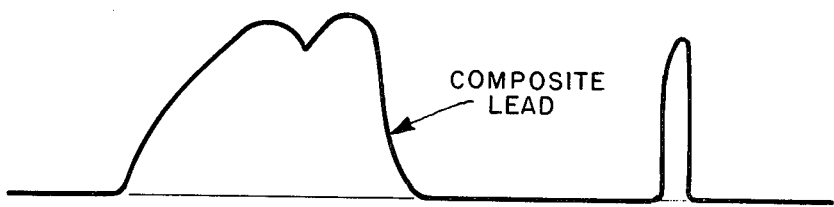

FIGS. 7a, 7b, and 7c graphically present the first and second lead signals for a typical wheel skid, and will be used to explain the operation of the program of FIGS. 6a and 6b. FIG. 7a shows wheel velocity as a function of time during a typical wheel skid. Thus, the wheel velocity starts at a higher value, falls rapidly to a lower value, and then recovers to a value close to the initial higher value. The first lead signal is proportional to the first derivative of the wheel velocity, and is shown in dotted lines in FIG. 7b. The second lead signal is proportional to the second time derivative of the wheel velocity, and is shown in dashed lines in FIG. 7b.

The program of FIGS. 6a and 6b operates to set the composite lead signal at a value proportional to the greater of the two lead signals, as shown in FIG. 7c. The proportionality constant is, of course, a function of the gain value selected from the gain table as a function of the instantaneously prevailing value of PBM. As discussed above, the composite lead signal is clamped to values greater than 0, as shown in FIG. 7c.

In actual field tests, the above described embodiment has been found to provide a particularly effective composite lead signal. Because only the greater of the two lead signals is selected for use in the composite lead signal, there is no possibility of interference between the two lead signals. In prior art devices, it has been common practice simply to add first and second lead signals together in an analog manner. When this is done, cancellation of one lead signal by the other can reduce the composite lead signal to an undesirably low value. This is because the second order lead signal is negative for a large part of the second half of a skid cycle.

In alternate embodiments, it may be preferable to combine the first and second lead signals in other ways which also ensure that the two lead signals will not tend to cancel one another out. For example, the absolute values of the two lead signals can be added to ensure that the composite lead signal never falls below the larger of the two lead signals. Throughout this specification and the following claims, the terms "greater" and "lesser" have been used in conjunction with lead signals in terms of the effect of the lead signal on the braking action. Thus, the term greater is used to indicate a lead signal indicative of a greater reduction in the braking action applied to the braked wheel, and the term lesser is used to indicate a lead signal indicative of a lesser reduction in braking action applied to the braked wheel. Of course, it will be understood that the polarities of digital or analog representations of the first and second lead signals may well be reversed in alternative embodiments.

In the preferred embodiments described above the first and second order differences have been used as an approximation of the first and second time derivatives, respectively, of the wheel speed signal. In digital systems it is often preferable to use differences rather than derivatives. However, the novel features of the present invention can also be advantageously used with time derivatives. In the following claims the term time derivative is used in its generic sense and is meant to include approximations of derivatives such as differences.

Of course, it should be understood that various changes and modifications of the preferred embodiment described above will be apparent to those skilled in the art. For example, gains and clamp values can be changed and other antiskid systems, such as acceleration based systems, can be substituted for the velocity based antiskid system shown. In addition, it may be preferable to implement this invention in analog form in some applications. Such changes and modifications can be made without departing from the spirit and scope of the present invention and without diminishing its attendant advantages. It is therefore intended that the foregoing detailed description be regarded as illustrative rather than limiting, and that it be understood that it is the following claims, including all equivalents, which are intended to define the scope of this invention.

TABLE I

```
;
;
;               FIRST ORDER LEAD
LEAD1X          LD DE,(VELOC2)
                LD HL,(VELOC1)
                XOR A
                SBC HL,DE
                JR NC,LEAD1A
                ADD HL,HL
                ADD HL,HL
                LD D,H
                LD E,L
                ADD HL,HL
                ADD HL,DE
                LD B,(IY+VGAIN1-RAM);
                GET MULTIPLIER FOR GAIN
COMPENSATION
LEAD1C          ADD HL,DE
                DJNZ LEAD1C
                LD A,MAXLEAD ;
                CLAMP IF LEAD IS TOO BIG
                CP H
                JR C,LEAD1D
                LD HL,MAXLEAD*256
LEAD1D          LD BC,(COMPOS);
                GET COMPOSITE SIGNAL VALUE
                ADD HL,BC
                JR C,LEAD1B
                LD HL,O
                JR LEAD1B
LEAD1A          LD D,H
                LD E,L
                ADD HL,DE
                LD BC,(COMPOS)
                ADD HL,BC
                JR NC,LEAD1B
                LD HL,OFFFH
```

TABLE I-continued

```
LEAD1B          LD B,H
                LD C,L
                RET
;
```

TABLE II

```
;
;               SECOND ORDER LEAD
;
LEAD2X          LD HL,(VELOC1); GET NEW VELOCITY
                LD DE,(VELOC3); GET OLD VELOCITY
                ADD HL,DE
                LD DE,(VELOC2)
                XOR A; CLEAR CARRY
                SBC HL,DE
                XOR A
                SBC HL,DE
                PUSH AF; SAVE FLAGS
                ADD HL,HL
                LD D,H
                LD E,L
                ADD HL,HL
                PUSH BC
                LD B,(IY+VGAIN2-RAM)
LEAD2B          ADD HL,DE
                DJNZ LEAD2B
                POP BC
                POP AF
                JR C,LEAD2A
                LD A, MAX2LD; CLAMP VALUE
                CP H
                JR NC,LEAD2C; SKIP IF LESS
                LD HL,MAX2LD*256
LEAD2C          ADD HL,BC
                JR LEAD2E
LEAD2A          LD A,MIN2LD; MINIMUM CLAMP
                CP H
                JR C,LEAD2D
                LD HL,MIN2LD*256
LEAD2D          ADD HL,BC
                JR C,LEAD2E
                LD HL,O
LEAD2E          RET
;
```

TABLE III

```
;
;               LEAD GAIN COMPENSATION
;
TORQX           LD DE,(PBM)
                SRL D
                SRL D
                LD HL,TABLE1
                LD E,D
                LD D,O
                ADD HL,DE
                LD A,(HL)
                LD (VGAIN1),A
                LD HL,TABLE3
                ADD HL,DE
                LD A,(HL)
                LD (VGAIN2),A
                RET
;
```

TABLE IV

```
;               FIRST ORDER LEAD
;               VARIABLE GAIN
;               LOOKUP TABLE
;
;
TABLE1          BYTE 2,2,2,2,2,3,3,3,4,4,4,4
                BYTE 5,5,5,5,8,8,8,8,10,10,10,10,10
                BYTE 10,10,10,10,10,10,10
;
```

TABLE IV-continued

```
;           SECOND ORDER LEAD
;           VARIABLE GAIN
;           LOOKUP TABLE
;
;
TABLE 3     BYTE 2,2,2,2,2,3,3,3,4,4,4,4
            BYTE 5,5,5,5,8,8,8,8,10,10,10,10
            BYTE 10,10,10,10,10,10,10,10
;
;
;           GENERAL CONSTANTS
;
;
MAXLEAD     EQU 0FDH ; CLAMP FOR LEAD VALUE (10 MA PRESS REDUCTION)
MAX2LD      EQU 6; MAX CLAMP FOR 2ND LEAD (21 MA)
MIN2LD      EQU −6; MIN CLAMP FOR 2ND LEAD (−21 MA)
;
;
;           RAM
;
;
VELOC1      EQU 820H; NEW VELOCITY
VELOC2      EQU 822H; PREVIOUS VELOCITY (ONE LOOP TIME BACK)
VELOC3      EQU 824H; PREVIOUS VELOCITY (TWO LOOP TIMES BACK)
VGAIN1      EQU 817H; FIRST ORDER GAIN COMPENSATION MULTIPLIER
VGAIN2      EQU 81DH; SECOND ORDER GAIN COMPENSATION MULTIPLIER
RAM         EQU 800H; BEGINNING OF RAM
PBM         EQU 80AH; PBM VALUE (TWO BYTES)
COMPOS      EQU 812H; COMPOSITE VALUE (TWO BYTES)
;
```

TABLE V

LEAD ROUTINE

```
COMPENSX    CALL VELOCX
            OR A
            JR NZ,COMPENSC
            LD HL,(DELTA1)
            LD (DELTA2),HL
            LD HL,(VELOC2)
            LD DE,(VELOC1)
            LD (VELOC2),DE
            OR A
            SBC HL,DE
            LD A,(NEWFLAG)
            OR A
            JR Z,COMPENSD
            SRA H
            RR L
            SRA H
            RR L
COMPENSD    LD (DELTA1),HL
            XOR A
COMPENSC    LD (NEWFLAG),A
            LD A,(PBM+1)
            LD L,A
            LD H,0
            LD DE,GAINTABL
            ADD HL,DE
            LD A,(HL)
            LD HL,(PRICLAMP)
            LD BC,PRISTEP
            ADD HL,BC
            EX DE,HL
            LD HL,(DELTA1)
            CALL CLAMPX
            LD DE,MAXCOMP
            CALL CLAMPX
            LD (PRICLAMP),HL
            LD B,H
            LD C,L
            LD HL,(DELTA1)
            LD DE,(DELTA2)
            OR A
            SBC HL,DE
            ADD HL,HL
            LD DE,SECCLAMP
            CALL CLAMPX
            OR A
            SBC HL,BC
            ADD HL,BC
            JR NC,COMPENSE
            LD H,B
            LD L,C
COMPENSE    ADD HL,HL
            CALL MULTI5X
            EX DE,HL
COMPENSZ    RET
;
;           PHASE COMPENSATION GAIN TABLE
;
GAINTABL    BYTE 17
            BYTE 17
            BYTE 17
            BYTE 17
            BYTE 17
            BYTE 13
            BYTE 11
            BYTE 9
            BYTE 7
            BYTE 5
            BYTE 4
            BYTE 4
            BYTE 4
            BYTE 4
            BYTE 4
            BYTE 4
;
MAXCOMP     EQU 20H
PRISTEP     EQU 5
SECCLAMP    EQU 10H
```

TABLE VI

MULTIPLY ROUTINE

```
MULTI5X     EX DE,HL
            LD B,5
            LD HL,0
            ADD A,A
            ADD A,A
            ADD A,A
MULTI5A     ADD HL,HL
```

TABLE VI-continued

MULTIPLY ROUTINE

|  |  |
|---|---|
|  | ADD A,A |
|  | JR NC,MULTI5B |
|  | ADD HL,DE |
| MULTI5B | DJNZ MULTI5A |
| MULTI5Z | RET |

TABLE VII

CLAMP ROUTINE

|  |  |
|---|---|
| CLAMPX | BIT 7,H |
|  | JR Z,CLAMP1 |
|  | LD HL,0 |
|  | JR CLAMPZ |
| CLAMP1 | CP A |
|  | SBC HL,DE |
|  | ADD HL,DE |
|  | JR C,CLAMPZ |
|  | EX DE,HL |
| CLAMPZ | RET |

I claim:

1. In an antiskid system including a wheel, a brake coupled to the wheel, means for generating a wheel signal indicative of wheel rotation, means responsive to the wheel signal for generating a brake control signal, and means responsive to the brake control signal for reducing braking action of the brake, the improvement comprising:
means for generating a first lead signal as a function of one selected time derivative of the angular velocity of the wheel;
means for generating a second lead signal as a function of another selected time derivative of the angular velocity of the wheel, different from the one selected time derivative, said second lead signal on occasion having a polarity different from that of the first lead signal;
means for generating a composite lead signal as a function of the first and second lead signals, such that the composite lead signal is no less than the greater of the first and second lead signals, even when the polarity of the first lead signal differs from that of the second lead signal; and
means for modifying the brake control signal as a function of the composite lead signal to provide lead compensation.

2. The invention of claim 1 wherein the one selected time derivative is the first time derivative and the other selected time derivative is the second time derivative.

3. The invention of claim 1 wherein the means for generating the composite lead signal is operative to set the composite lead signal to a value proportional to the greater of the first and second lead signals.

4. In an antiskid system including a wheel, a brake coupled to the wheel, means for generating a wheel signal indicative of wheel rotation, means responsive to the wheel signal for generating a brake control signal, and means responsive to the brake control signal for reducing braking action of the brake, the improvement comprising:
means for generating a first lead signal as a function of one selected time derivative of the angular velocity of the wheel;
means for generating a second lead signal as a function of another selected time derivative of the angular velocity of the wheel, different from the one selected time derivative;
means for selecting the one of the first and second lead signals indicative of a greater reduction in braking action;
means for generating a composite lead signal as a function of the selected lead signal to prevent the non-selected lead signal from interfering with the selected lead signal; and
means for modifying the brake control signal as a function of the composite lead signal to provide lead compensation.

5. The invention of claim 4 wherein the composite lead signal is proportional to the selected lead signal.

6. The invention of claim 4 wherein the one selected time derivative is the first time derivative and the other selected time derivative is the second time derivative.

7. In an antiskid system including a wheel, a brake coupled to the wheel, means for generating a wheel signal indicative of wheel rotation, means responsive to the wheel signal for generating a brake control signal as a time integral function of the difference between the angular velocity of the wheel and a threshold velocity, and means responsive to the brake control signal for reducing braking action of the brake, the improvement comprising:
means for generating a first lead signal as a function of a first time derivative of the angular velocity of the wheel;
means for generating a second lead signal as a function of a second time derivative of the angular velocity of the wheel;
means for selecting the one of the first and second lead signals indicative of a greater reduction in braking action;
means for generating a composite lead signal as a function of the selected lead signal to prevent the non-selected lead signal from interfering with the selected lead signal; and
means for modifying the brake control signal as a function of the composite lead signal to provide lead compensation.

8. The invention of claim 7 wherein the composite lead signal is proportional to the selected lead signal.

* * * * *